3,432,800
AUTOMATIC HOT LINE BREAKAWAY CLAMP
Daniel Joseph Goodman, Rte. 4, Box 170,
Lake Charles, La. 70601
Filed Dec. 11, 1967, Ser. No. 689,381
U.S. Cl. 339—109                 10 Claims
Int. Cl. H01r 13/24, 13/62, 3/00

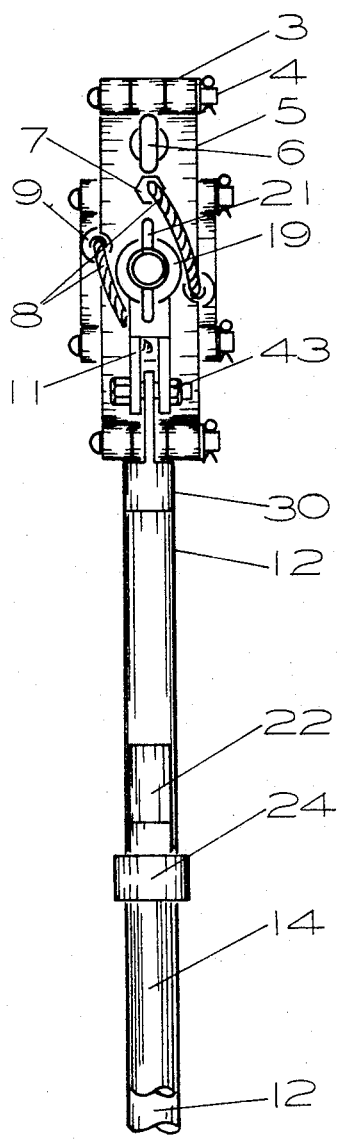

ABSTRACT OF THE DISCLOSURE

A breakaway clamp and hot stick assembly for hot line work comprising an operable, segmented inner ring and an operable, segmented outer ring fixedly joined together near the mouth of the opening segments and an elongated push rod which by increasing the distance between opposing segments of the rings causes the rings to open, the rings being tensioned to be normally closed. The tension and rings are so designed that should an emergency develop, the clamp automatically breaks away.

---

Figure 1:
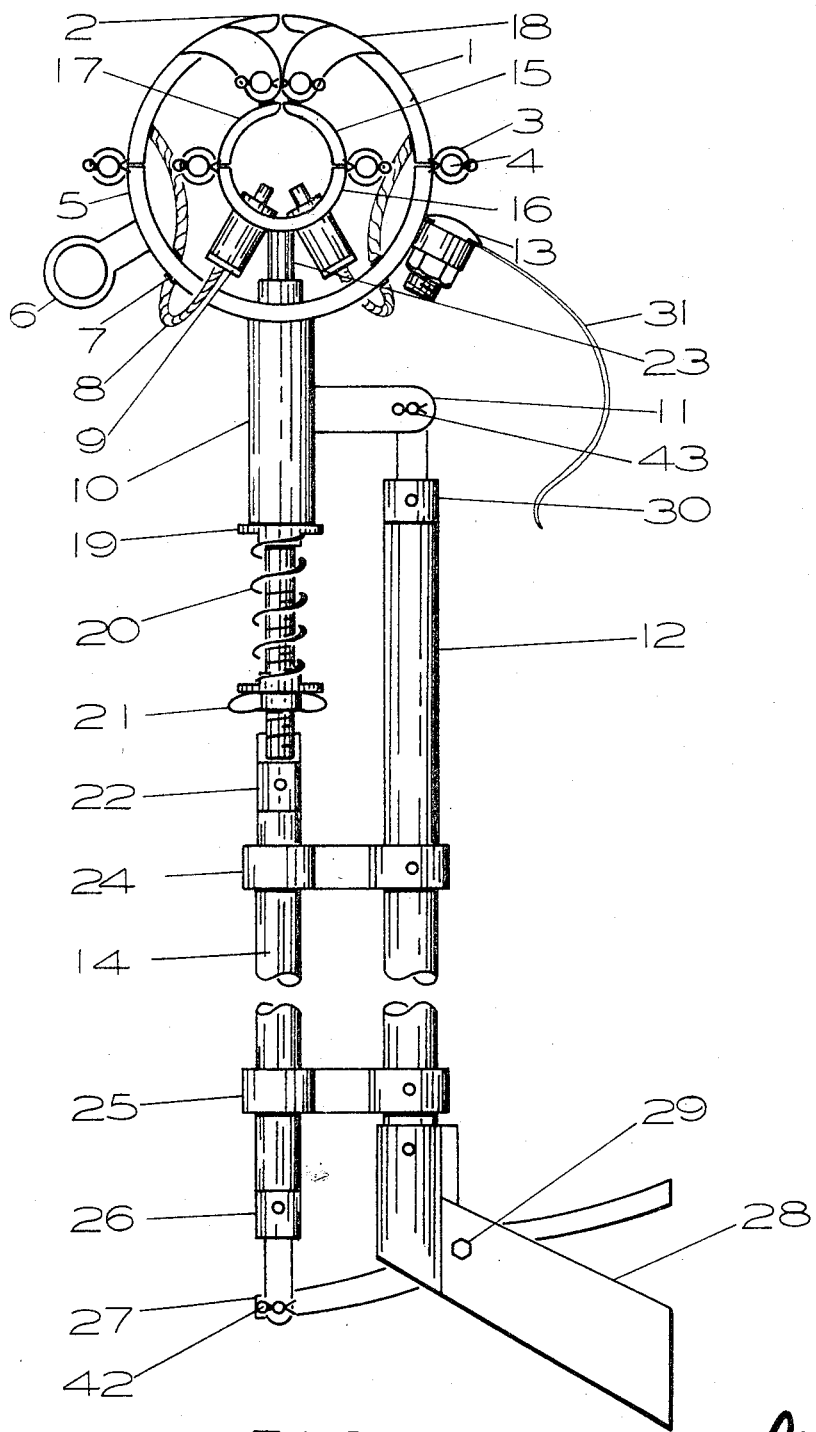

The invention relates generally to an improved hot line clamp having an automatic breakaway connection for use, for example, in the repair and maintenance of high voltage power transmission lines. The hot line clamp is used to electrically connect the line man to the high voltage line and thereby energize him and his equipment to line potential so that he may work on the line "barehanded": The clamp includes an automatic breakaway connection so that the electrical connection between the line man and the hot line is broken in case of emergency.

The invention is particularly useful in the "bare-hand method" of working, for example, a 500 kv. line on steel towers while the line is charged to its regular line potential with the line man swung into the line suspended from the top truss of the tower in a bosun chair on an insulated line and for illustrative purposes will be described with reference thereto. However, the invention's use, of course, is not limited to such use or purpose.

In the maintenance of such high voltage transmission lines, the work is preferably done while the line is energized at its regular line potential. This is done by line men on the poles or towers using hot line tools and the so-called "bare-hand method." On the "bare-hand method," a line man actually makes direct electrical contact with the energized line with a jumper wire and clamp (for example, the clamp of the present invention), thus putting himself at line potential. He is suspended from the tower or pole on a polydacron line in a bosun chair and, at very high voltages, wears a special hot line suit. This suit is of nylon and carbon cloth and is electrically conductive. The suit has a "tail" on it to electrically connect it to the hot line. The "tail" is mechanically and electrically connnected to hot line clamp and hot stick assembly of the present invention, and the later enters the electrical field around the conductor ahead of the line man to accept the charging current. After he had made electrical contact on the line, the line man is hoisted into working position and ties himself to a ring bolt on the automatic breakaway clamp set to the desired tension to anchor him to the line. The clamp is also his electrical connection; and, thus, if there is, for example, a failure in any of the hoisting equipment and the line should fall, the lineman and his equipment (as will be explained in detail below) will automatically be taken off the line electrically and mechanically at the same time and remain in the clear.

It is thus the object of the invention to provide an improved electrical connection for the line man to energize himself to the line.

Another object of the invention is to provide an anchor point for the line man to tie himself to his electrical connection.

Another object of the invention is to provide a safety clamp so that if some failure should occur the lineman is automatically and simultaneously freed from the line mechanically and electrically.

Another object of the invention is to allow the line man to be able to set his break away connection to any desirable tension.

Figure 2:
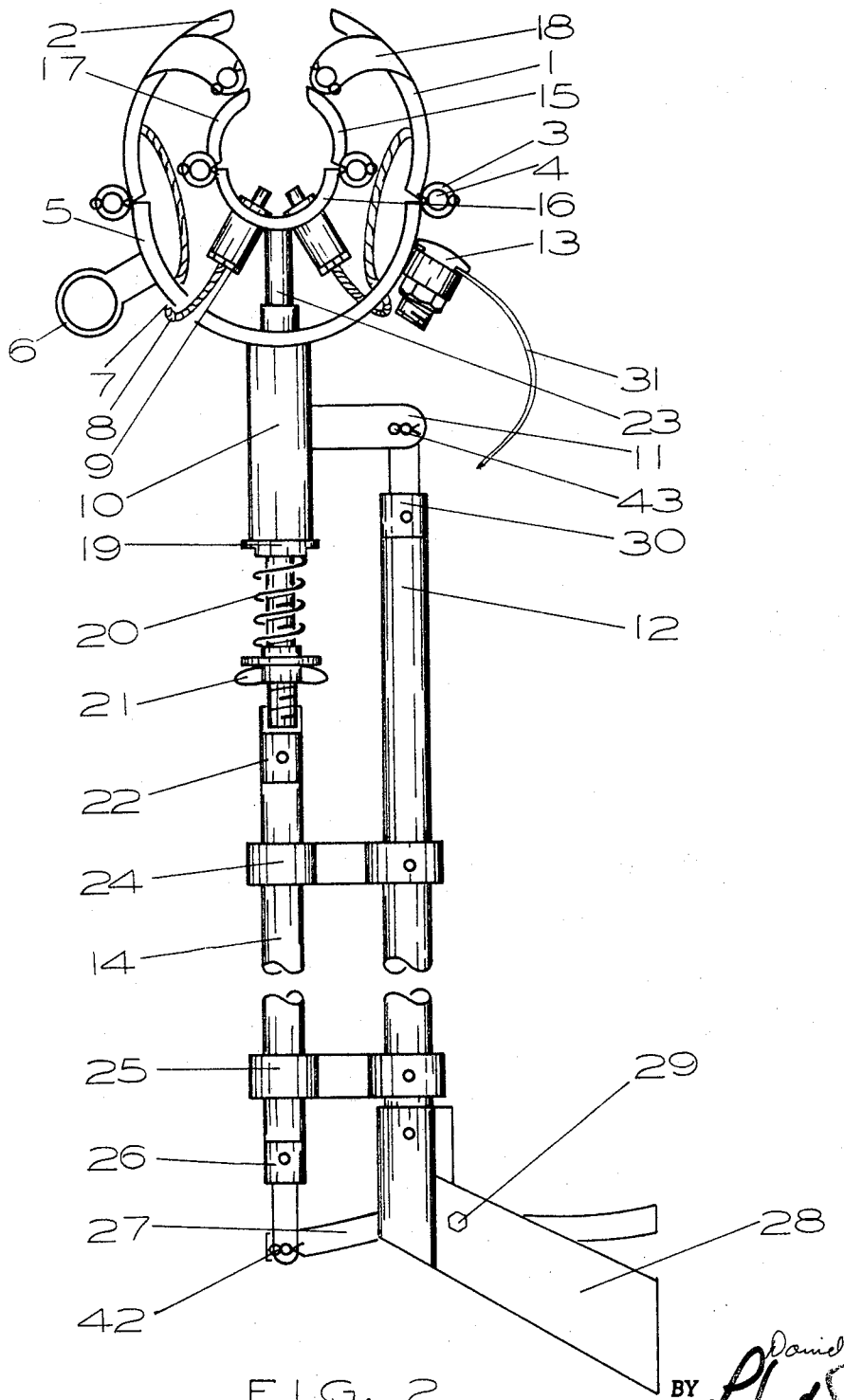

Other objects will become clear and a full understanding of the invention may be had by referring to the following description and claims taken together with the accompanying drawings, in which:

FIGURE 1 is a plan view with the clamp closed;
FIGURE 2 is a plan view with the clamp open;
FIGURE 3 is a back view closed with operating handle swing down;
FIGURE 4 is a view of the inner clamp and wire sizing filler and a cut away of brush assembly; and
FIGURE 5 is a detail of the wire sizing filler.

Referring to FIGURES 1–3, the hot line damp and hot stick assembly of the invention comprises two segmented, concentric, metal rings, an outer, larger ring 1, 2, 5 and an inner, smaller ring 15, 16 17, the latter for grasping the hot line. The segments of the two rings are hinged together with loose pin hinges 3, 4. The outer ring is mounted on a metal tube 10, onto which a metal clevis 11 is attached. The inner ring by means of segments 15 and 17 is hinged by the same type of loose pin hinges 3 and 4 to the curved metal brackets 18 which are welded to the outer ring by means of segments 1 and 2. By this hinged arrangement, the inner and outer rings open and close together. Thus, when push rod 23 is pushed or pulled with respect to the metal tube 10, both rings open and close respectively, making a controlled clamp. The amount of movement and tension applied to the clamp is controlled through rod 23, which passes through metal tube 10, and is backed up by the combination of spring 20 and washers 19 and wing nut 21. When wing nut 21 is run in on the threaded portion of rod 23, more tension is applied to prevent the clamp from opening; when wing nut 21 is run out on the threaded portion of rod 23, the spring allows the clamp to be opened more easily. Thus, the clamp may be set to the tension desired for proper breakaway of the clamp from its purchase on the conductor. Electrical contact between the clamp and the hotline or wire is assured by a pair of spring loaded brushes 32 which are placed in the inner ring on segment 16 in order to seek contact with the wire no mater what the wire size. Solid electrical contact is further assured by the brush leads 8 which bypass the loose pin hinge joints.

The opening edges of ring segments 15, 17, 1 and 2 are rounded off and smoothed off and may be bronzed to prevent conductor damage when breakaway occurs. A lug 13 is bonded to the outer ring segment 5 and jumper wire 31 is solidly connected thereto. The jumper wire 31 is (at its other end, connected to the hot line suit that the lineman wears or to the hot line aerial basket that he is in, as the case may be, thus putting him at line potential.

The ring bolt 6 is used by the line man to tie himself to the clamp and thus to the line when he is using a bosun chair to thereby give him an anchor point.

Power to open the clamp to install it on the line is applied when the line squeezes the operating rod 27 which is pivoted in pistol grip handle on bolt 29. The handle 28 is attached to a fiber glass rod 12 which is attached to member 30 and pivoted in clevis 11 with a bolt or pin 43. Metal guides 24 and 25 are provided on the fiber glass rod 12 to serve as supports for the fiber glass rod 14 which is attached to the rod 27 through metal clevis 26 and pin 42. The other end of the fiber glass rod 14 has mounted thereon a metal sleeve 22 which is cut away to allow the removal of rod 14 when not in use.

When squeeze rod 27 is compressed it pushes the rod 14 and applies pressure on rod 23 which compresses spring 20 and pushes the inner ring forward and, in so doing, it also opens the outer ring of the clamp. When the handle is released, the spring 20 closes the clamp over the conductor. The spring loaded brushes 32 are at point contact with the conductor as long as the clamp is closed on the wire. Rod 14 with members 12, 28, etc. are swung down out of the way by applying a small amount of reverse pressure on rod 27 which takes sleeve 22 off the end of rod 23 and allows it to pivot down around the bolt 43 and out of the way.

When the line man wishes to disengage himself, both mechanically and electrically, from the wire, a sharp tug on his anchor cord attached to the anchor or ring bolt 6 is sufficient to cause the clamp to open and the wire to pass out of the rings. He, of course, may also disengage himself by reinserting the end of the rod 23 into the handle assembly 12, 14, 28 and squeezing trigger rod 27.

The diameter of the inner ring is determined by the diameter of the largest wire with which the clamp is to be used (plus appropriate tolerances for clearance). For a good mechanical purchase when lesser diameter wires are to be encountered, appropriate inserts 35, 36, 37 are provided as shown in FIGURES 4 and 5. The insert elements 35, 36, and 37 are bolted into the clamp when needed by bolts 41, 40 and 39, respectively.

As is true of most, if not all, mechanical inventions, many variations may be made in the arrangement, functional relationship, and physical design of the parts without departing from the spirit and scope of the invention. Hence, the above disclosed details should in most instances be considered exemplary and not restrictive and the scope of the invention is defined by the claims set out below.

What is claimed as invention is:

1. A breakaway clamp comprising: an inner member (15, 16, 17) and an outer member (1, 2, 5); said inner member having two stages, an open stage (FIGURE 2) and a closed stage (FIGURE 1), and being under tension normally maintaining it in its closed stage; said outer member being connected to said inner member at at least two areas, one of the areas being a fixed connection (18) and the second being a movable connection (10, 23), said movable connection varying the distance between a first portion (16) of the inner member and a first portion (5) of the outer member and the fixed connection maintaining the distance between a second portion (15) of the inner member and a second portion (1) of the outer member constant; whereby when the distance between said first portions is increased, the inner member tends to open and when decreased, tends to close.

2. The breakaway clamp of claim 1 in which: said clamp further includes a second fixed connection between the inner and outer members, said second fixed connection maintaining the distance between a third portion (17) of the inner member and a third portion (2) of the outer member constant; said inner member is cylindrically shaped when closed and has at least three connected segments (15, 16, 17), a middle segment (16) and two end segments (15, 17), said two end segments having free ends which come into juxtaposition when said inner member is in its closed stage; said outer member has at least three connected segments (1, 2, 5), a middle segment (5) and two end segments (1, 2), said first portions being identical with said middle segments and said second and third portions being identical with said end segments, respectively.

3. The breakaway clamp of claim 2 in which said movable connection comprises an elongated rod (23) which contacts said middle segment of the inner member and a bushing (10) through which said elongated rod passes and which is fixedly attached to said middle segment of the outer member; said inner and outer members being symmetrical about a plane passing through the axis of said elongated rod and through the axis of the cylindrical shape of said inner member.

4. The breakaway clamp of claim 3 in which: said end segments of said inner member each equal one-half the length of said middle segment of said inner member and segments are pivotally joined together; said end segments of said outer member are pivotally joined to said middle segment of said outer member; and the points of rotation of all of the pivoting joints (4) lie in a straight line and said segments of said outer member define a cylindrical surface when said inner member is in its closed stage.

5. A breakaway tool for use on high power lines including a clamp for engaging the line comprising: an inner member having a middle (16) and two end (15, 17) segments pivotally joined together and an outer member also having a middle (5) and two end (1, 2) segments pivotally joined together, said inner member being capable of being either open or closed, said three segments of said inner member forming a ring when closed and the pivotal joints (4) between all of said segments lying in a straight line when said inner member is closed, a limited tension member (20) for biasing said inner member in its normally closed position, an actuating assembly connected to said inner and outer members including a distance varying means (10, 23) for changing the separation distance between said middle segments of said inner and outer members, and two connection means for maintaining a constant separation distance between the respective end segments of the inner and outer members; whereby when the separation distance between said middle segments increases the inner member opens or, when a force greater than that produced by said limited tension member is applied to the inner member, the clamp breaks away.

6. The tool of claim 5 in which said inner member includes at least one electrical contact brushing (32) resiliently mounted and extending into the closed area defined by said inner member when closed.

7. The tool of claim 5 in which said distance varying means is an elongated rod fixedly attached to the central portion of said middle segment of said inner member and journaled through a bushing fixedly attached to said outer member, and said limited tension member is a spring positioned around said rod and bearing against the end (19) of said bushing farthest away from said inner member and against an extended area portion of said rod.

8. The tool of claim 7 which further includes a hot stick assembly connected to said clamp, said hot stick assembly having a support rod (12) of electrically insulating material firmly attached to said outer member at one end and having a handle and trigger assembly (28, 29) attached to its other end, one end of said trigger being connected to said elongated rod; whereby when said trigger is depressed said elongated rod pushes said middle segment of said inner member away from the middle segment of said outer member and the inner member is thereby opened.

9. The tool of claim 5 in which said outer member includes an anchor means (6) for attaching an anchor rope thereto; whereby the clamp can be quickly released by applying a force on said inner member greater than that produced by said tension means.

10. The tool of claim 5 which has included therewith at least one insert member (35, 36, 37) having a substantial thickness and whose outer surface follows the inner surface of said inner member and has attachment means for attaching it to said inner member; whereby said clamp can be used with lines of various diameters.

References Cited

UNITED STATES PATENTS

| | | | |
|---|---|---|---|
| 1,667,332 | 4/1928 | Stahler | 269—287 X |
| 1,777,395 | 10/1930 | Coon | 339—109 X |
| 1,833,756 | 11/1931 | Perazzoli | 339—109 |
| 3,183,469 | 5/1965 | Trachtenberg | 339—255 X |
| 3,249,350 | 5/1966 | Shultz | 269—238 X |

RICHARD E. MOORE, *Primary Examiner.*

U.S. Cl. X.R.

24—249; 339—255